United States Patent
Shing-Neng et al.

(10) Patent No.: US 6,939,045 B1
(45) Date of Patent: Sep. 6, 2005

(54) SLIDER OF LINEAR GUIDEWAY

(75) Inventors: Jou Shing-Neng, Taichung (TW); Chen Hsing-Liang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 10/807,704

(22) Filed: Mar. 23, 2004

(51) Int. Cl.[7] ............................................. F16C 29/06
(52) U.S. Cl. ........................................................ 384/45
(58) Field of Search ............................. 384/45, 43, 44; 464/168

(56) References Cited

U.S. PATENT DOCUMENTS

| 4,655,611 A | * | 4/1987 | Kondo | 384/45 |
| 5,044,779 A | * | 9/1991 | Albert et al. | 384/15 |

\* cited by examiner

Primary Examiner—Lenard A. Footland
(74) Attorney, Agent, or Firm—Charles E. Baxley

(57) ABSTRACT

The present invention relates to a slider of linear guideway which includes the sliding-block, the end-cup and the ball retainer. The characteristic of this present invention is that the ball retainer doesn't use the screws for firm, therefore can scant the finished cost and the fabricated time. Besides, the ball retainer can provide the force to support between two ends of the ball retainer, thereby can increase the strength of the ball retainer to avoid changing the shape.

5 Claims, 6 Drawing Sheets

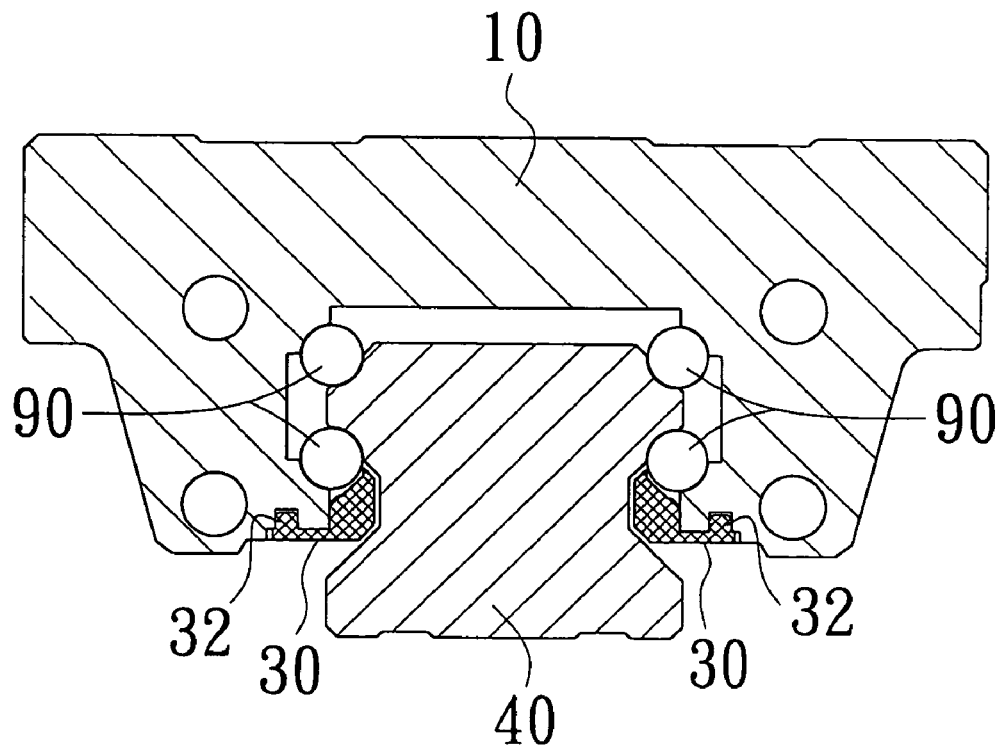
F I G. 5

SLIDER OF LINEAR GUIDEWAY

BACKGROUND OF THE INVENTION

1. Field of the Invention

The present invention relates to a slider of linear guideway, the linear guideway is precision-controlled linear guiding mechanism, which is widely applied to automatic equipments, industrial mechanism, mechanical arms, measuring instruments and electronics.

2. Description of the Prior Arts

Many machines are provided with linear guiding mechanism, linear guideway is a linear guiding mechanism. And a slider for conventional linear guideway as shown in FIG. 6, which generally comprises a sliding block 50 and end-cup 80. Retaining plate 60 serves to retain the balls to the sliding block 50, and the retaining plate 60 contacts against an outer side of the balls so as to prevent the disengagement of the balls from the sliding block 50. The retaining plate 60 is fixed to the sliding block 50 by virtue of screws 70, accordingly plural threaded holes 51 should be defined on the sliding block 50 and the retaining plate 60 should be provided with equal numbered through holes 61. And then the screws 70 insert through the through holes 61 of the retaining plate 60 and to be screwed in the threaded holes 51 of the sliding block 50, thus the retaining plate 60 is fixed to the sliding block 50.

The conventional slider uses the screws 70 to fix the retaining plate 60, to make sure the retaining plate 60 is hard enough, the retaining plate 60 is normally metal-made and processed by punching and folding. However, the noise will be caused when the balls roll on the metal-made retaining plate 60, and the service life of the ball will be substantially reduced, furthermore, since the precision reproduction of the punching and folding processes is not good, the forming of the retaining curve surface 62 for retaining balls on the retaining plate 60 is difficult and its precision cannot be controlled easily, it is susceptible to interference. On the other hand, when the sliding block 50 is relatively large, the slenderness ratio of the retaining plate 60 will be too high and resulting in deformation in the middle portion of the retaining plate 60.

Moreover, the conventional sliding block 50 should be additionally provided with a screwing process for forming the threaded holes 51, thereby the production cost is relatively increased. And the screws 70 will probably cause deformation of the retaining plate 60 during assembly, and also it is time-consuming and laborsome to assemble and disassemble the retaining plate 60.

The present invention has arisen to mitigate and/or obviate the afore-described disadvantages of the conventional slider of linear guideway.

SUMMARY OF THE INVENTION

The primary object of the present invention is to provide a screw-less ball-retaining device for slider of a linear guideway, the sliding block is low cost and easy-and-quick assembled, and the geometry strength of the ball retainer on the sliding block is increased so as to prevent the deformation.

To achieve the above-mentioned object, the ball retainer on slider of the linear guideway in accordance with the present invention is screw-less assembled to the slider by cooperation with the end-cup. Wherein the ball retainer is provided with tongue structure to insert in notch of the end-cup, such that the ball retainer is easy-and-quick assembled, so as to enhance the assembly efficiency of the slider. Due to screw-less structure, the sliding block doesn't need to be defined with threaded holes, and thus the production cost and assembly time of the slider is relatively reduced.

Furthermore, in consideration of long-sized slider of linear guideway, the corresponding slenderness ratio is high and it is susceptible to deformation, to overcome this, other portion on the ball retainer in accordance with the present invention, besides the both ends, can provide support strength for the ball retainer. Thus the geometry strength of the ball retainer on the sliding block is increased so as to prevent the deformation.

In addition, the ball retainer in accordance with the present invention can be made by plastic ejection molding, so as not only to reduce the noise caused by metal-collision while prolonging the service life, but also to reduce the production cost of the entire linear guideway and overcome the problem that the precision is difficult to be controlled.

The present invention will become more obvious from the following description when taken in connection with the accompanying drawings, which shows, for purpose of illustrations only, the preferred embodiment in accordance with the present invention.

BRIEF DESCRIPTION OF THE DRAWINGS

FIG. 5 is a cross sectional view of the assembly of the sliding block and the rail in accordance with one aspect of the present invention;

DETAILED DESCRIPTION OF THE PREFERRED EMBODIMENT

Figure 1:
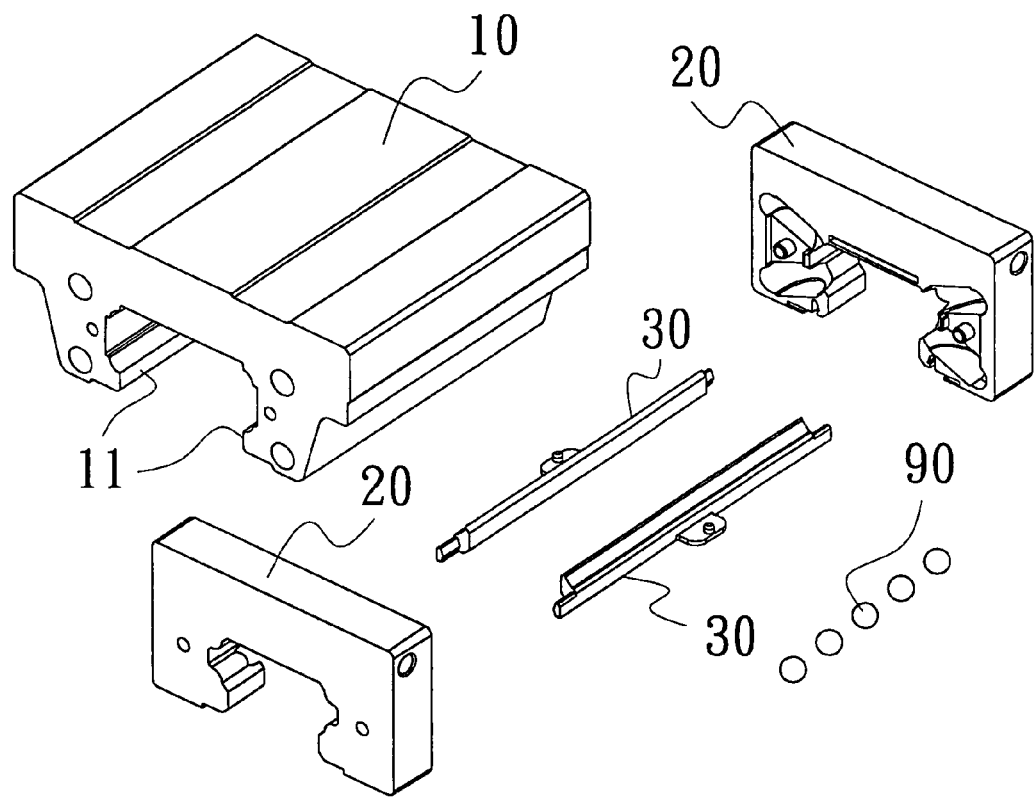
FIG. 1 is an exploded view of a slider in accordance with one aspect of the present invention.

FIG. 1 is an exploded view of a slider of linear guideway in accordance with one aspect of the present invention, wherein the slider of linear guideway generally includes a sliding block 10 (which is interiorly defined with sliding groove for balls 90 to roll), end-cup 20 which allows the balls 90 to reflow, and ball retainer 30 which retains the balls 90 on the sliding block 10. The ball retainer 30 is fixed on mating face 11 of the sliding block 10.

Figure 2:
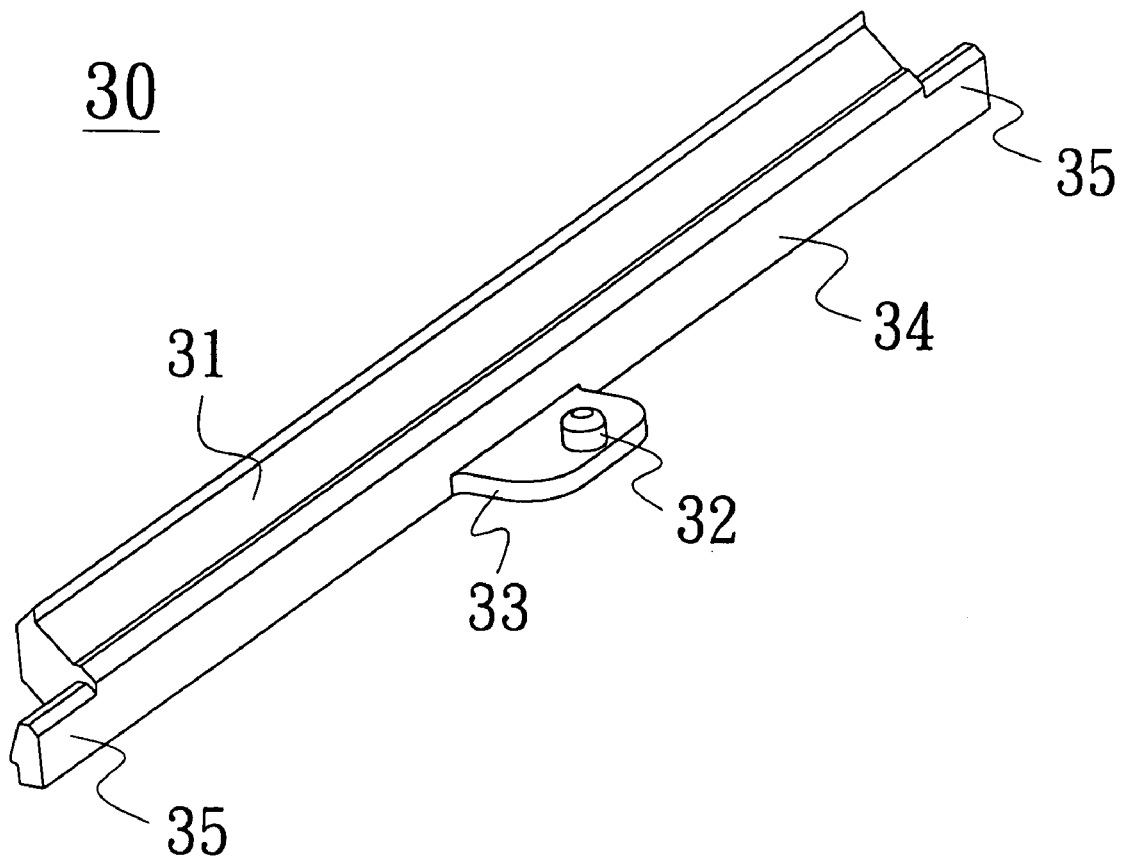
FIG. 2 is an amplified view of the ball retainer in FIG. 1.

FIG. 2 is an amplified view of the ball retainer in FIG. 1. The ball retainer 30 is provided with a retaining surface 31 for the balls 90 to roll against without dropping from the sliding block 10. At both ends of the ball retainer 30 are respectively provided with a tongue member 35 (tiny hook shaped), which can be inserted in the end-cup 20 of FIG. 1 so as to fix the ball retainer 30. Furthermore, the ball retainer 30 is defined with a mating face 34 for abutting against the mating face 11 of the sliding block 10. To improve the whole geometric strength of the ball retainer 30, at a middle portion of the ball retainer 30 can be additionally formed with an extension 33, on which a locating pin 32 is defined and employed to be fixed to the bottom of the sliding block 10. Besides being supported by the tongue members 35 at both ends, the ball retainer 30 is additionally supported by the locating pin 32 at the extension 33, such that it can be prevented from deformation.

Figure 3:
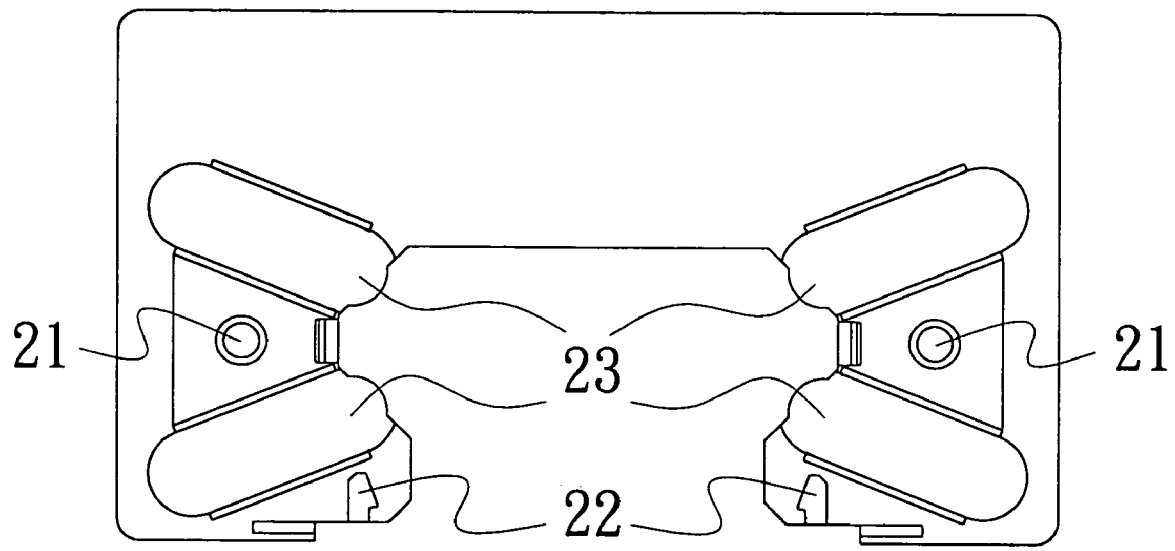
FIG. 3 is an amplified view of the end-cup in FIG. 1.

FIG. 3 is an amplified view of the end-cup in FIG. 1, wherein the end-cup 20 is provided with positioning holes 21, through which the end-cup 20 can be fixed to both ends of the sliding block 10, so as to move synchronously with the sliding block 10. The end-cup 20 is further provided with reflow path 23 for the balls 90 to roll around, and a notch 22 is formed on the end-cup 20, in the notch 22 is provided with an inverted hook structure which serves to work with the tongue member 35 of the ball retainer 30, so as to position the ball retainer 30.

Figure 4:
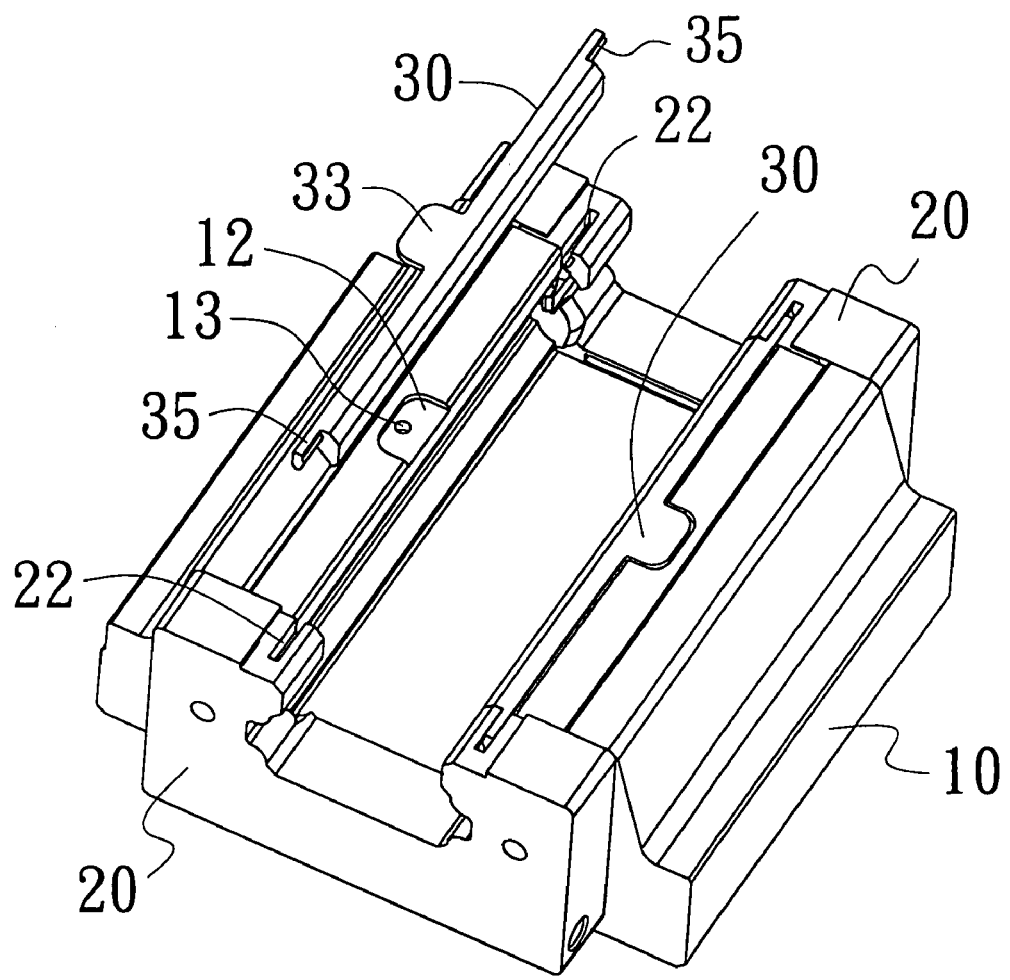
FIG. 4 is a perspective assembly view of a slider in accordance with one aspect of the present invention.
Figure 6:
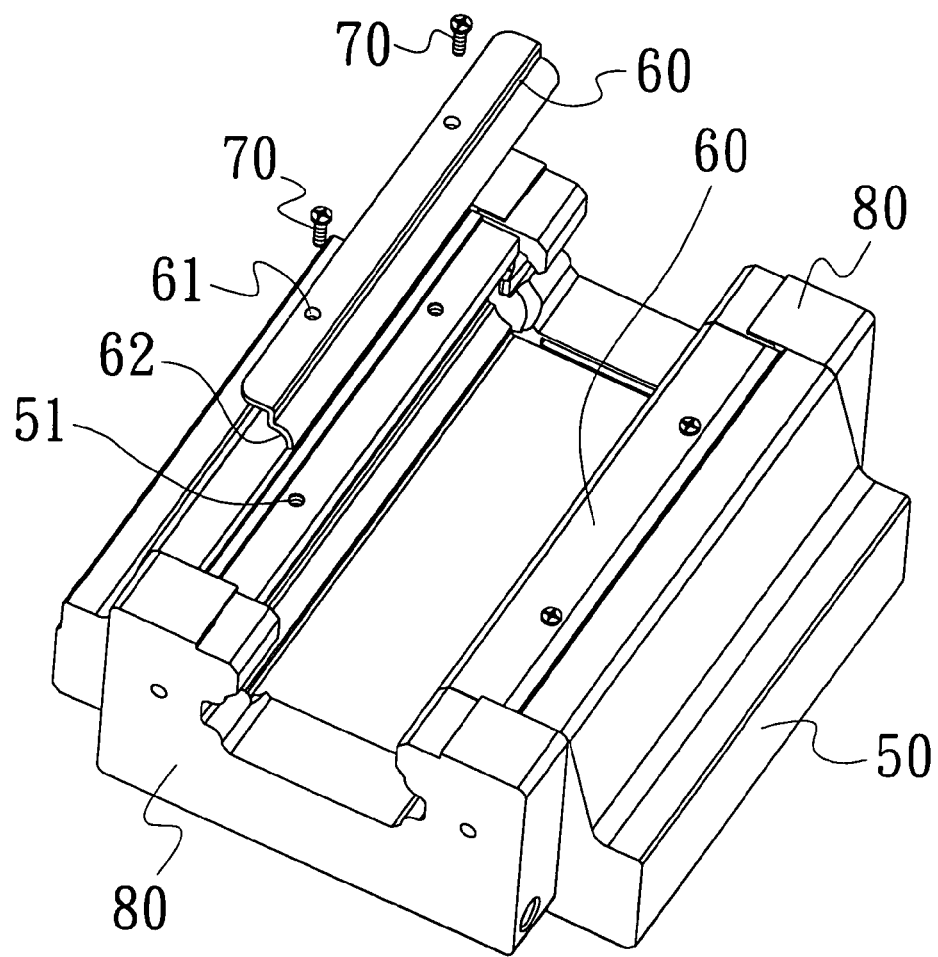
FIG. 6 is a perspective view of a conventional slider of linear guideway.

FIG. 4 is a perspective assembly view of a slider in accordance with one aspect of the present invention, it can be seen that the end-cup 20 is assembled to both ends of the sliding block 10 for allowing the balls (not shown) to circulate in the sliding block 10. The ball retainer 30 is fixed to the bottom of the sliding block 10 where abutting against the end-cup 20, that is the tongue member 35 at both ends of the ball retainer 30 inserts in the notch 22 of the end-cup 20, whereas the extension 33 engages in a positioning groove 12 of the sliding block 20. In the positioning groove 12 a hole 13 is defined for the insertion of the positioning pin (not shown) on the extension 33, such that the portion between both ends of the ball retainer 30 is supported by the extension, and thus the ball retainer 30 can be prevented from deformation.

Referring further to FIG. 5, which is a cross sectional view of the assembly of the sliding block and the rail in accordance with one aspect of the present invention. The balls 90 roll between the sliding block 10 and the rail 40 so as to realize relative movement of the sliding block 10 relative to the balls 90. The ball retainer 30 is assembled to the bottom of the sliding block 10, when the positioning pin 32 inserts in the hole 13 of the sliding block 30, it not only can fix the middle portion of the ball retainer 30, but also can provide supporting force to prevent the fall of the middle portion of ball retainer 30.

While we have shown and described various embodiments in accordance with the present invention, it should be clear to those skilled in the art that further embodiments may be made without departing from the scope of the present invention.

What is claimed is:

1. A slider of linear guideway, comprising:
    a sliding block interiorly provided with sliding groove for balls to roll;
    an end-cup fixed to both ends of the sliding block for circulation of the balls, the end-cup provided with a notch;
    a ball retainer, at both ends of which respectively provided with a tongue member which can be inserted in the notch so as to fix the ball retainer, at a middle portion of the ball retainer formed with an extension, on the extension defined with a locating pin and employed to be fixed to a bottom of the sliding block, so as to improve whole geometric strength of the ball retainer, and prevent deformation of the ball retainer.

2. The slider of linear guideway as claimed in claim 1, wherein an inverted hook structure is defined in the notch.

3. The slider of linear guideway as claimed in claim 1, wherein the tongue member at both ends of the ball retainer is hook-shaped.

4. The slider of linear guideway as claimed in claim 1, wherein the ball retainer is not fixed with screws and bolts.

5. The slider of linear guideway as claimed in claim 1, wherein the ball retainer is made by plastic ejection molding.

* * * * *